(12) United States Patent  (10) Patent No.: US 7,710,894 B2
Karstens  (45) Date of Patent: May 4, 2010

(54) METHOD, COMPUTER PROGRAM PRODUCT, AND APPARATUS FOR AUTOMATICALLY ADAPTING HARDWARE AND SOFTWARE PREFERENCES BASED ON A NETWORK CONNECTION

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 11/614,381

(22) Filed: Dec. 21, 2006

(65) Prior Publication Data

US 2008/0155125 A1  Jun. 26, 2008

(51) Int. Cl.
*H04L 12/26* (2006.01)
(52) U.S. Cl. .................................. 370/252; 370/465
(58) Field of Classification Search ................. 370/252, 370/465
See application file for complete search history.

(56) References Cited

U.S. PATENT DOCUMENTS

| 6,023,729 | A | 2/2000 | Samuel et al. |
| 6,401,094 | B1 | 6/2002 | Stemp et al. |
| 6,686,931 | B1 | 2/2004 | Bodnar |
| 7,076,539 | B2 | 7/2006 | Reese et al. |
| 2002/0142792 | A1* | 10/2002 | Martinez ..................... 455/550 |
| 2003/0046557 | A1 | 3/2003 | Miller et al. |
| 2005/0010871 | A1 | 1/2005 | Ruthfield et al. |
| 2006/0129544 | A1* | 6/2006 | Yoon et al. ..................... 707/3 |
| 2006/0132473 | A1* | 6/2006 | Fuller et al. ................. 345/204 |
| 2007/0078730 | A1* | 4/2007 | Serra et al. .................... 705/26 |

\* cited by examiner

*Primary Examiner*—Melvin Marcelo
(74) *Attorney, Agent, or Firm*—Cantor Colburn LLP; Steven Bennett

(57) ABSTRACT

Software and hardware user preferences of a communication device are automatically adapted for different networks. Communication is initiated between a communication device and a first network. The communication is detected, the first network is identified, and the software and hardware preferences are automatically set in the communication device, as predetermined by the user for the first network. For communication with a second network, the communication between the communication device and the first network is suspended, and communication is initiated between the communication device and the second network. The communication between the communication device and the second network is detected, the second network is identified, and the software and hardware preferences of the communication device are automatically adapted to software and hardware preferences, as predetermined by the user for the second network.

20 Claims, 5 Drawing Sheets

METHOD, COMPUTER PROGRAM PRODUCT, AND APPARATUS FOR AUTOMATICALLY ADAPTING HARDWARE AND SOFTWARE PREFERENCES BASED ON A NETWORK CONNECTION

BACKGROUND

The present invention relates generally to network connections, and, more particularly, to automatically adapting user preferences based on a network connection.

Networked data communication systems enable users to perform a variety of useful tasks. Networked communication systems may be used in homes, at work locations, or in any other environment having network connection capabilities.

A problem with using multiple networks is that some software and hardware may only be available on select networks. In particular, some software/hardware items may only be available on certain networks. One example of such as item is a network printer. A user typically connects to a personal network at home and to a work network at work. The user may have a number of personal and work network printers or other peripherals installed. The user may prefer to print at a printer at home when he or she is at home and print at a printer at work when he or she is at work. Currently, if the user is using the same computer at home and at work, the user will see both personal (home) and work printers as printer options and will have to select between them. However, the user will not be able to print from the work network using the personal (home) network, so the user does not truly have an option to use any printer except the home printer. Thus, presenting this option is a waste of time for the user.

Another example of a hardware/software item that cannot typically be used across multiple networks is an instant messager application. A user typically has a buddy list filled with numerous personal and non-personal (work) instant messenger buddy names. The user typically sends instant messages to his or her work buddies while at work and sends messages to his or her personal buddies when not at work. Currently, when the user is using the same computer to connect to the home network and the work network, he or she is presented with both work and personal buddy names and is given the option of selecting a buddy to send messages to. However, if the user is connected to the work network, it is not possible for the user to instant message personal buddies. Thus, providing the user at work with a list of personal buddies that can only be messaged from the home network is a waste of time.

As another example, a user may have favorite web browser links that may be listed in many different ways, e.g., as graphical buttons, menu bar lists, etc. The user's favorites link list is typically filled with numerous personal and work favorite links. Typically, the user prefers to use work links while at work and use personal links when not at work. If the user is using the same computer at home and at work, the personal and work links are presented as options. However, if the user is connected to the work network, it is not possible for the user to browse the personal links from the favorites list. Thus, presenting the personal links as options is a waste of time.

Another problem with using multiple networks is that certain software/hardware options are more preferable on some networks than on other networks. For example, at the user's workplace, wireless access points in different areas of the building may support different levels of hardware encryption ranging from none to 256-bit encryption. Thus, although the user may prefer the maximum 256-bit encryption, he or she may have to just use the "best available" encryption. At home, however, the user typically always wants to "force" the best encryption, e.g., 256-bit encryption, and does not want to connect at any other encryption. Currently, however, if the user is using the same computer at home and at work, the user must manually select either the "best available" mode or the "force best encryption" mode. Requiring the user to make this selection at home when the user always wants to force the best encryption wastes the user's time.

Another example of an option that may not be available on multiple networks is the choice of antivirus CPU utilization. For example, while the user is at work, time is often critical, and the user cannot afford any slowdowns in computing response time. Thus, at work, the user may set the CPU utilization for antivirus scanning to only 5%. The problem with this 5% unitization is that it would take 3 days to scan the user's storage device from start to finish. At home, however, the user is typically not as concerned about computer response time and may set the CPU utilization for antivirus scanning to 85%. Currently, in this scenario, if the user is using the same computer at work and at home, the user must manually switch between 5% CPU utilization and 85% CPU utilization. As with the encryption selection, requiring the user to make this selection is a waste of time.

One proposed solution for solving these problems is to enable the user to create multiple operating system user ids, application profiles, time schedules, or the like to attempt to segment times and options on his or her computer into "home", "work" "traveling", etc. groups. For example, the user can log into his computer with his "home" userids and password and will only see his "home" web browser links. If the user wants to see his or her "work"web browser links, the user simply logs of his "home" account then relogs into his computer with his "work" userid and password. This is cumbersome and time consuming.

SUMMARY

According to exemplary embodiments, software and hardware user preferences of a communication device are automatically adapted for different networks. Communication is initiated between a communication device and a first network. The communication is detected, and the first network is identified. The software and hardware preferences are automatically set in the communication device, as predetermined by the user for the first network.

According to exemplary embodiments, for communication with a second network, the communication between the communication device and the first network is suspended, and communication is initiated between the communication device and the second network. The communication between the communication device and the second network is detected, the second network is identified, and the software and hardware preferences of the communication device are automatically adapted to software and hardware preferences, as predetermined by the user for the second network.

BRIEF DESCRIPTION OF THE DRAWINGS

Referring to the exemplary drawings wherein like elements are numbered alike in the several Figures.

DETAILED DESCRIPTION

According to exemplary embodiments, a technique is provided for segmenting hardware/software items and options using data collected about network types and network connections. According to an exemplary embodiment, data collected about network types and network connections is used to automatically make decisions to support a user's preferences.

Figure 1A:
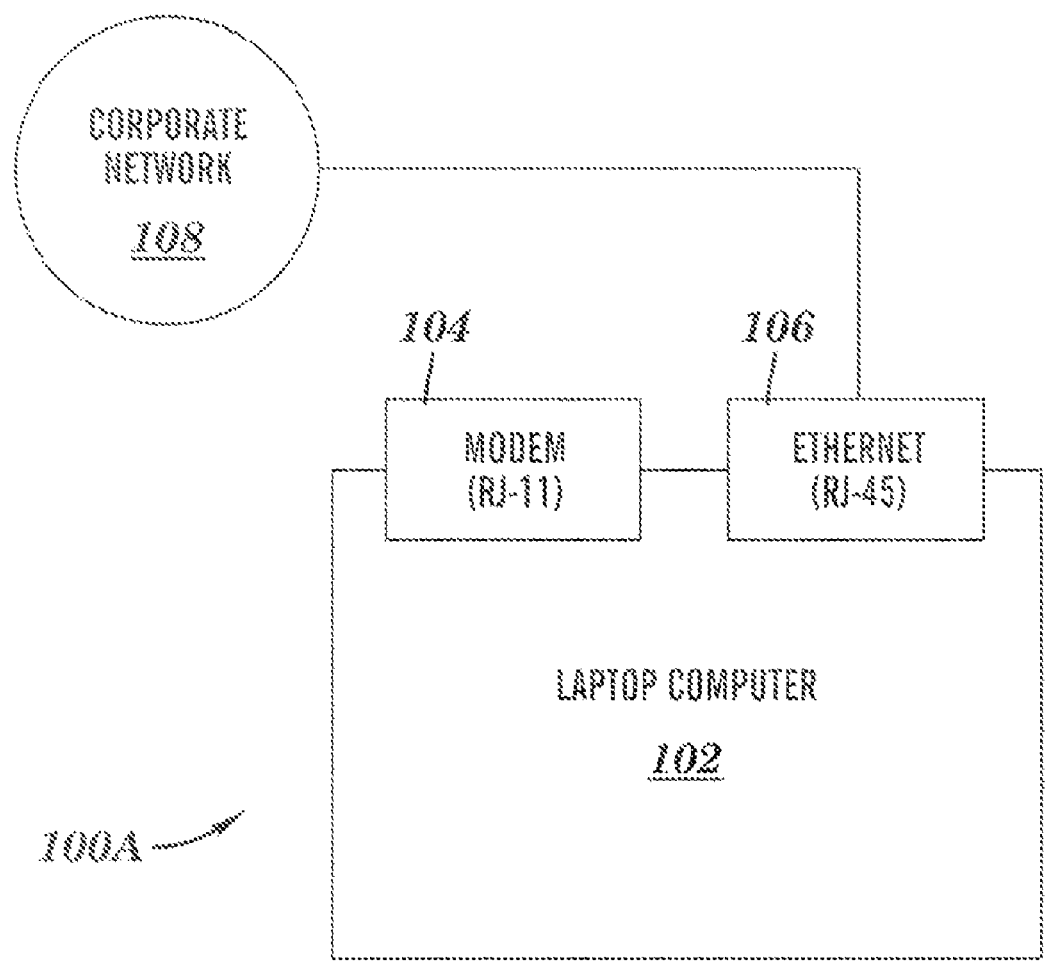
FIG. 1A illustrates an exemplary communication device connected to a "work" network according to an exemplary embodiment.
Figure 1B:
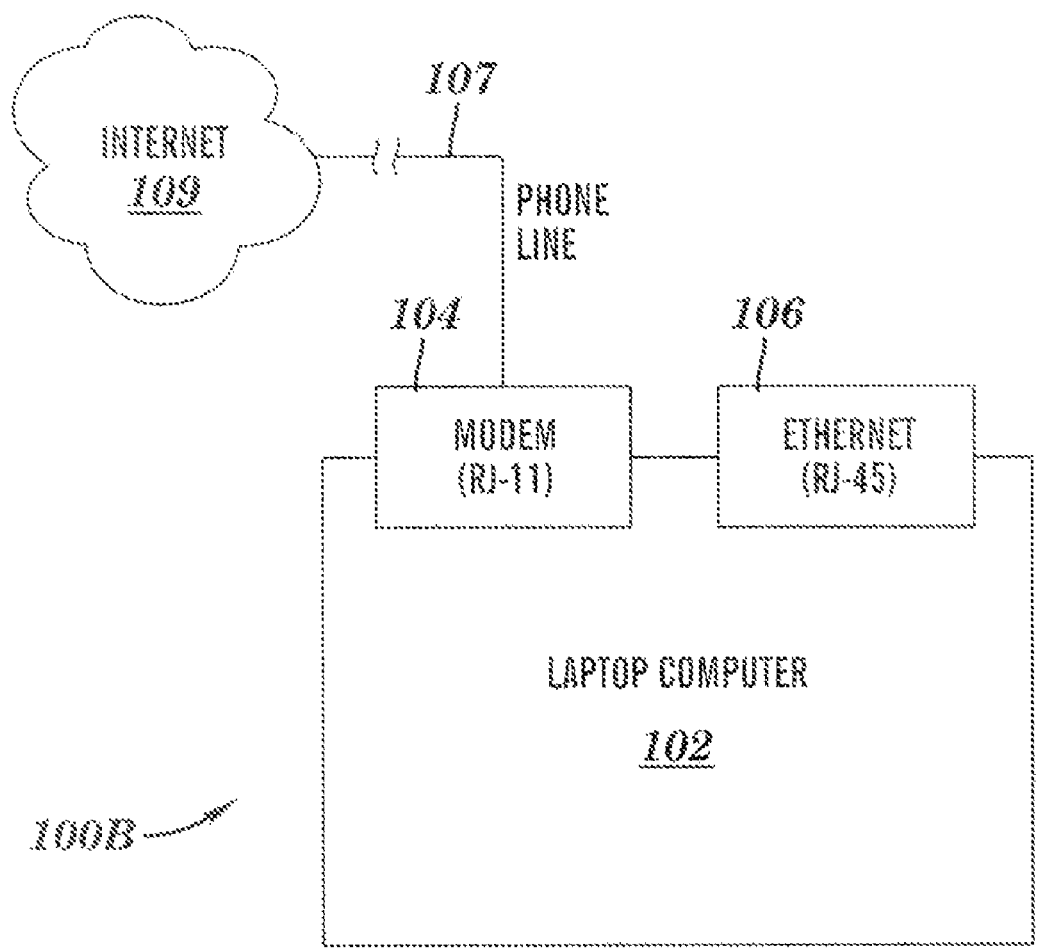
FIGS. 1B and 1C illustrate connections of a communication device to a "home" network according to an exemplary embodiment.
Figure 1C:
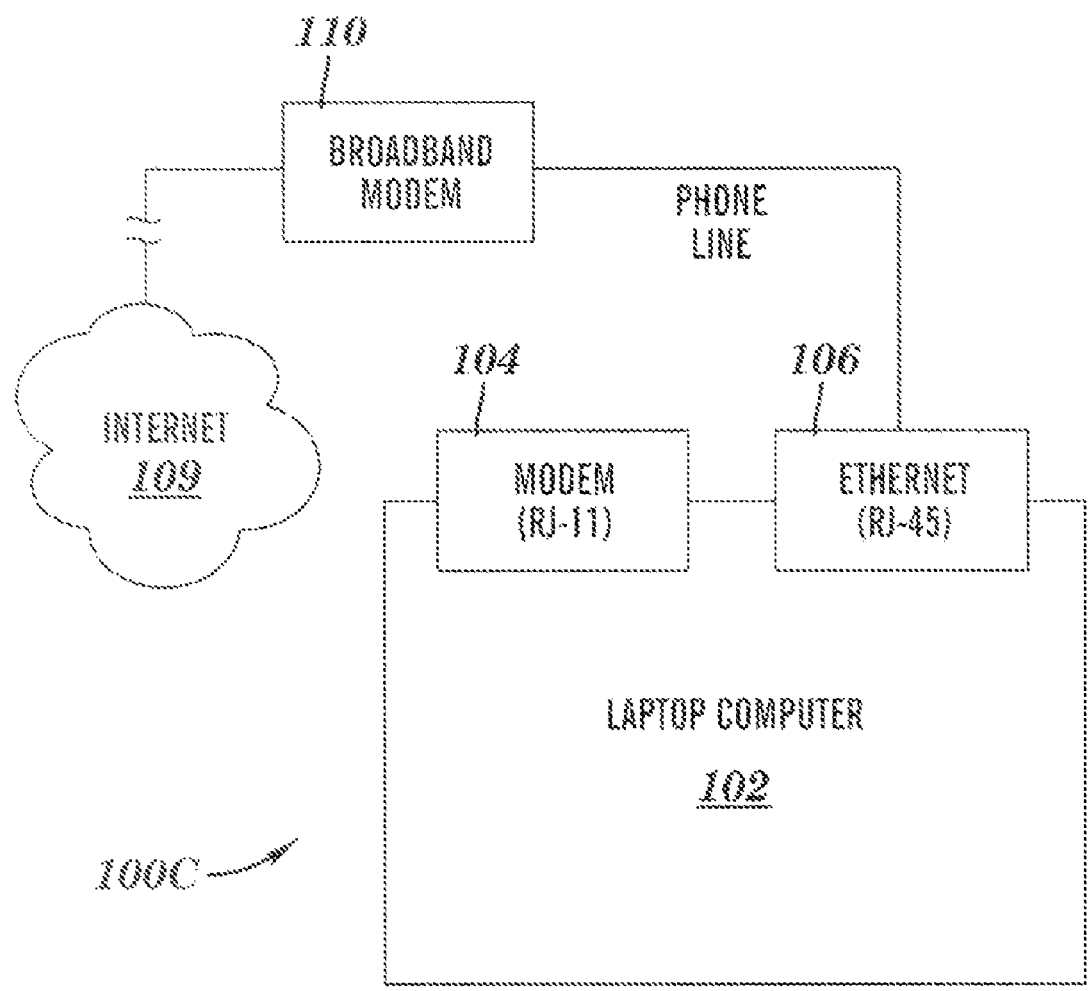

FIGS. 1A, 1B, and 1C illustrate exemplary implementations in which a device for adapting user preferences may be employed. FIG. 1A shows an example of a "work" environment 100A in which a user's communication device is connected to a "work" network. FIGS. 1B and 1C show examples 100B, 100C, respectively, of a "home" environment in which a user's communication device is connected to a home network. Although "work" and "home" networks are shown for ease of illustration, it should be appreciated that the networks need not be a "home" network or a "work" network. Rather, the user may be connected to any network, and many networks may be associated as one network.

Referring to FIG. 1A, a user is connected via a laptop computer 102 to a "work" network, e.g., corporate network 108, while at work. An Ethernet adapter 106 is used to connect to the corporate network via an RJ-45 connector. In FIG. 1B, the user is connected via a laptop computer 102 to a "home" network, e.g., the Internet 109. A modem 104 is used to connect to the Internet via an RJ-11 connector and a phone line 107. In FIG. 1C, the user is connected to the Internet 109 via a broadband modem 110 or cable modem. The Ethernet adapter 106 is used to connect the laptop computer 102 to the broadband modem 110.

Although FIGS. 1A-1C show examples of network connectivity scenarios in which the technique for adapting user preferences may be implemented according to exemplary embodiments, other network connectivity scenarios may be used. For example, other than a corporate network and the Internet, other networks may be connected to at home or at work. Examples of such networks include Ethernet networks, intranets, extranets, local area networks (LANs), wide area networks (WANs), virtual private networks (VPNs), etc. Also, communication devices other than a laptop computer may be used. Further, although wired connections are shown, it should be appreciated that the communication device may be connected to a network wirelessly.

Figure 2:
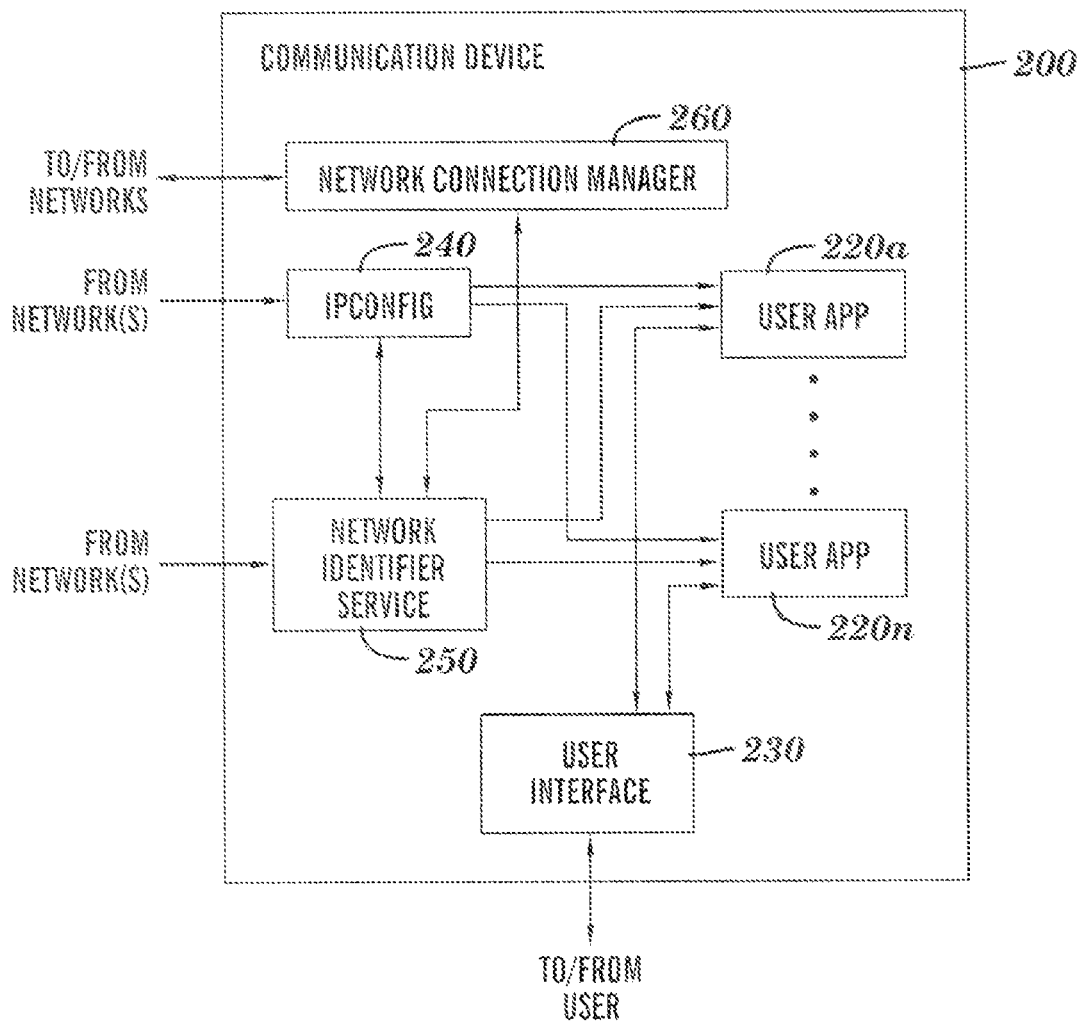
FIG. 2 illustrates an apparatus for adapting communication device user preferences based on a connection to a network according to an exemplary embodiment.

FIG. 2 illustrates an exemplary communication device 200 for adapting user preferences according to exemplary embodiments. According to an exemplary embodiment, the communication device 200 may be any device in communication with a network (wired or wirelessly), including but not limited to a personal laptop, a computer, or a PDA. The communication device is in contact with a user via a user interface 230. User preferences for different networks may be input using the user interface 230. Alternatively, some preferences may be set as defaults for different networks.

According to an exemplary embodiment, the user may set preferences for different networks for various user applications 220a-220n via the user interface 230. The user applications may include, e.g., a web browser, printer manager, an instant messaging application, etc. The user preferences may include, for example, peripherals to connect to, a messaging buddy list, web browser favorite links, encryption levels, and an antivirus CPU utilization. So, for example, the user may select favorite "home" and "work" links for the web browser application, select one or more "home" and "work" printer(s) for the printer application, and specify "work" buddies and "home" buddies via the user interface 230. The selected preferences may be set within the user applications or stored within a memory (not shown) for later recall. The preferences may include those predetermined by the user and any default preferences.

The communication device 200 also includes a network connection manager 260 that detects communication with various networks. The network connection manager shows the configuration of network adapters (ip address, gateway address, etc.) and the status of the networks (connected/disconnected).

According to an exemplary embodiment, an application, such as ipconfig 240, collects lower level details about a network connection. The user applications 220a-220n may look at ipconfig 240 directly to determine the network(s) the communication device is connected to.

According to another embodiment, a network identifier service 250 detects a network configuration change from a network and reads details about the network configuration from an application, such as ipconfig 240 or the network connection manager 260. The network identifier service 250 then determines which network the communication device 200 is connected to and provides this information to other applications within the communication device 200 and services enabled to support the service. The network identifier service 250 labels the networks as, e.g., "network 1", "network 2", etc. The user can change the label text to better describe the networks, e.g., "home", "work", etc. using a user interface. Thus, according to this embodiment, the user application 220a-220n may look to the network identifier service 250 to determine which network(s) the communication device is connected to rather than having to examine the lower level network information to determine the network connection.

The network identifier service 250 may use raw networking information (e.g., gateway addresses) to determine which network(s) the communication device is connected to. The network identifier service may also use a combination of raw networking information and adapter activity to determine network connections. The network identifier service 250 may look at the network connection manager 260 or ipconfig 240 to obtain low level network information and then translate that information into a group name, e.g., "home" or "work". As a network connection changes from home to work, the network identifier service 250 changes the network connection information from "home" to "work".

The network connections may be labeled, e.g., as "home" or "work" using flags. As an example, assume there is flag managed by the network identifier service 250 for labeling a network connection, and the flag is set to "home". A user application, such as a web browser, can then poll the network identifier service or subscribe to it to obtain this flag information. The user application may also subscribe to the network identifier service to be notified if the flag changes. As an example, consider a web browser. When the web browser starts, it may poll the network identifier service to retrieve the "home" flag, subscribe to the network identifier service to receive updated flag information, and display the "home" links. Assume, then, that the user browses the Internet for several minutes and then suspends connection of the communication device to the home network and takes the communication device to work. When the user arrives at work, he or she unsuspends the device, the device joins the work network, and the flag is updated to "work". The web browser, which is still active from the home session, is notified of the change by the network identifier service and automatically hides the "home" links and then shows only the "work" links.

Although not shown in the interest of simplicity of illustration, it should be appreciated that the computer 200 may include other elements, e.g., a microprocessor, various software applications, etc.

According to exemplary embodiments, a communication device identifies a certain network type (hardware), IP address range, gateway, subnet, domain name, other network information, or any combination of these as network 1. The user optionally labels this network "home". Later the same device identifies another certain network type (hardware). IP addresses range, gateway, subnet, domain name, other network information or any combination of these as network 2. The user optionally labels this network as "work".

Further, the user can optionally associate two or more networks together. For example, if the user is connected at home with a hardwired Ethernet adapter and a wireless Ethernet adapter, the user may associate the "home wireless" and "home hardwire" network under a parent "home" network. Adding networks to groups may be considered as being similar in nature to adding buddies to a buddy list. The same network may belong to different groups. For example, a "Florida" network may belong to an "East Coast" network group and a "South East" network group.

Further, according to exemplary embodiments a "network" may be defined using AND, OR, and NOT operations. For example, if a user is connected to network 1 AND network 2, the network is determined to be the "home" network. If the user is connected to network 1 OR network 2, the network is determined to be the "home" network. If the user is NOT connected to network 1 ("home"), the user is considered to be traveling, e.g., using a "traveling" network. The AND, OR, and NOT logic may be applied at the network identifier service level and/or at the user application (e.g., web browser) level.

Figure 3:
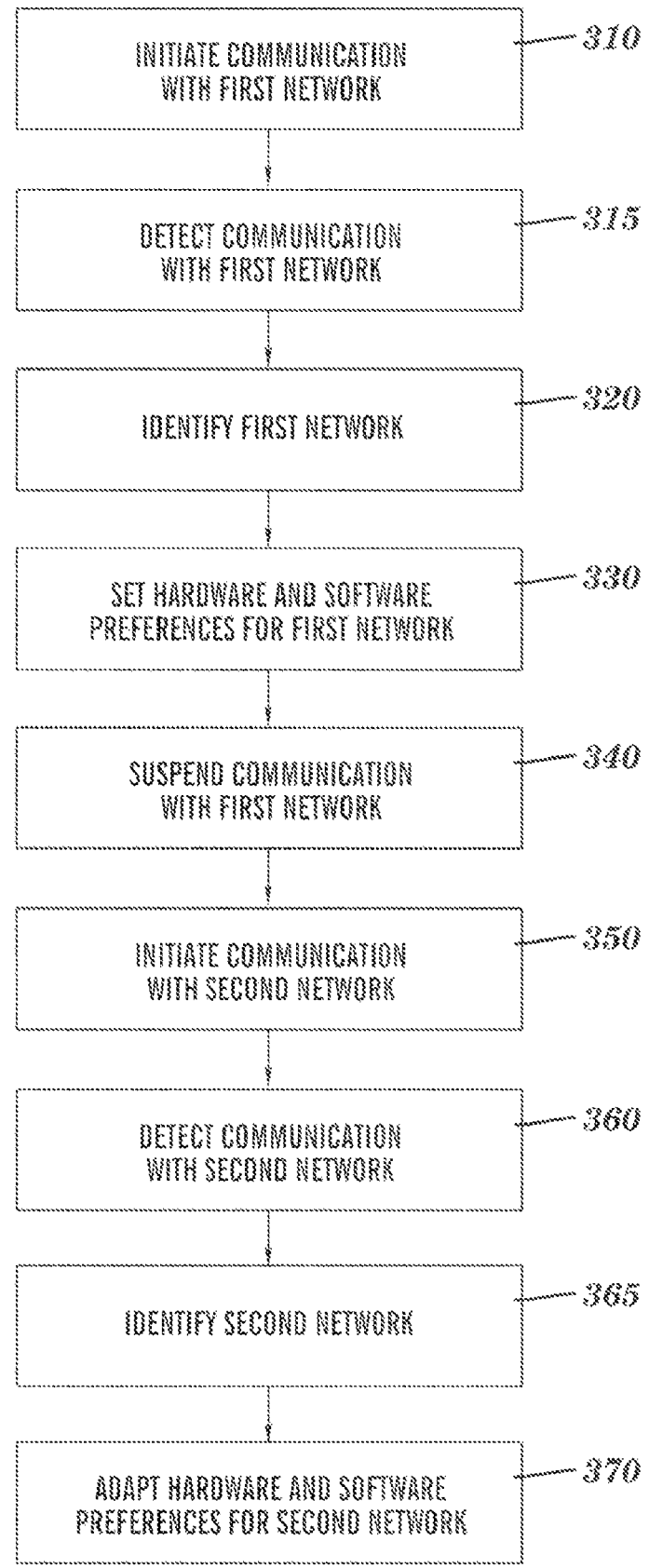
FIG. 3 illustrates a method for adapting communication device user preferences based on a connection to network according to an exemplary embodiment.

FIG. 3 illustrates an exemplary method for adapting a communication device's user preferences based on a network connection. The method begins at step 310 at which a communication is initiated between a communication device and a first network. At step 320, communication is detected between the communication device and the first network. At step 325, the first network is identified. At step 330, the software and hardware preferences in the communication device are automatically set, as predetermined by the user for the first network. At step 340, communication between the communication device and the first network is suspended. At step 350, communication between the communication device and a second network is initiated. At step 360, communication between the communication device and the second network is detected. At step 365, the second network is identified. At step 370, the software and hardware preferences of the communication device are automatically adapted to software and hardware preferences, as predetermined by the user for the second network.

As described above, exemplary embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, stored in a storage medium and loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is :

1. A method for adapting software and hardware user preferences of a communication device for different networks, comprising the steps of:
    initiating communication between the communication device and a first network;
    detecting communication between the communication device and the first network;
    identifying the first network;
    automatically setting the software and hardware preferences in the communication device, as predetermined by the user for the first network;
    suspending communication between the communication device and the first network;
    imitating communication between the communication device and a second network;
    detecting communication between the communication device and the second network;
    identifying the second network; and
    automatically adapting the software and hardware preferences of the communication device to software and hardware preferences, as predetermined by the user for the second network.

2. The method of claim 1, wherein the steps of identifying comprise recognizing a flag indicating communication with a particular network or obtaining network configuration information directly.

3. The method of claim 1, wherein the steps of identifying use logical operators to identify a network to which the communication device is connected.

4. The method of claim 1, wherein the software and hardware preferences include at least one of: peripherals to connect to, a messaging buddy list, web browser favorite links, encryption levels, and an antivirus CPU utilization.

5. The method of claim 2, wherein the step of recognizing a flag includes polling a network identifier service or polling lower level connection details.

6. The method of claim 2, wherein the step of recognizing a flag includes subscribing to a network identifier service.

7. The method of claim 1, wherein at least one communication network includes one or more associated networks.

8. A computer program product for adapting software and hardware user preferences of a communication device for different networks, comprising a computer usable medium having a computer readable program, wherein the computer readable program, when executed on a computer, causes the computer to:

initiate communication between the communication device and a first network;

detect communication between the communication device and the first network;

identify the first network;

automatically set the software and hardware preferences in the communication device as predetermined by the user for the first network;

suspend communication between the communication device and the first network;

initiate communication between the communication device and a second network;

detect communication between the communication device and the second network;

identify the second network; and automatically adapt the software and hardware preferences of the communication device based on software and hardware preferences predetermined by the user for the second network.

9. The computer program product of claim 8, wherein the computer program causes the computer to recognize a flag indicating communication with a particular network or obtain a network configuration directly.

10. The computer program product of claim 8, wherein the computer readable program causes the communication device to identify a network based on logical operators.

11. The computer program product of claim 8, wherein the preferences include at least one of: peripherals to connect to, a messaging buddy list, web browser favorite links, encryption levels, and an antivirus CPU utilization.

12. The computer program product of claim 9, wherein the computer readable program causes the computer to recognize a flag by polling a network identifier service or lower level connection details.

13. The computer program product of claim 9, wherein the computer readable program causes the computer to recognize a flag by subscribing to a network identifier service.

14. The computer program product of claim 8, wherein at least one communication network includes multiple associated networks.

15. An apparatus for adapting software and hardware user preferences of a communication device for different networks, comprising:

at least one user application;

a user interface for receiving user input setting preferences for the user application for different networks; and a network connection manager; and a network identification application for identifying a network that the communication device is connected to, wherein the network connection manager initiates and detects communication between the communication device and a first network, the user application obtains information identifying the first network from the network identification application and automatically sets the user preferences, as predetermined by the user for the first network, the network connection manager suspends communication between the communication device, initiates communication between the communication device and a second network, and detects communication between the communication device and the second network, and the user application obtains information identifying the second network from the network identification application and automatically adapts the user preferences, as predetermined by the user for the second network.

16. The apparatus of claim 15, wherein the user application obtains information identifying a particular network by recognizing a flag indicating communication with a network or obtaining a network configuration directly.

17. The apparatus of claim 15, wherein the user application obtains information identifying a particular network based on logical operators.

18. The apparatus of claim 15, wherein the preferences include at least one of: peripherals to connect to, a messaging buddy list, web browser favorite links, encryption levels, and an antivirus CPU utilization.

19. The apparatus of claim 16, wherein the user application recognizes a flag indicating communication with a particular network by polling a network identifier service or lower level network connection details or by subscribing to a network identifier service.

20. The apparatus of claim 15, wherein at least one communication network includes multiple associated networks.

* * * * *